(12) United States Patent
Nelson et al.

(10) Patent No.: US 6,954,622 B2
(45) Date of Patent: Oct. 11, 2005

(54) COOPERATIVE TRANSMISSION POWER CONTROL METHOD AND SYSTEM FOR CDMA COMMUNICATION SYSTEMS

(75) Inventors: David S. Nelson, Salt Lake City, UT (US); Lyman D. Horne, Salt Lake City, UT (US); Delon K. Jones, West Bountiful, UT (US)

(73) Assignee: L-3 Communications Corporation, New York, NY (US)

( * ) Notice: Subject to any disclaimer, the term of this patent is extended or adjusted under 35 U.S.C. 154(b) by 353 days.

(21) Appl. No.: 10/059,938

(22) Filed: Jan. 29, 2002

(65) Prior Publication Data

US 2003/0144019 A1 Jul. 31, 2003

(51) Int. Cl.[7] ................................................ H01Q 11/12
(52) U.S. Cl. ........................... 455/127; 455/522; 455/69
(58) Field of Search ................................ 455/127, 522, 455/69, 13.1, 513, 574, 572

(56) References Cited

U.S. PATENT DOCUMENTS

| | | | |
|---|---|---|---|
| 5,056,109 A | 10/1991 | Gilhousen et al. | |
| 5,129,098 A | 7/1992 | McGirr et al. | |
| 5,257,283 A | 10/1993 | Gilhousen et al. | |
| 5,278,992 A | 1/1994 | Su et al. | |
| 5,345,598 A | 9/1994 | Dent | |
| 6,101,179 A | 8/2000 | Soliman | |
| 6,163,705 A * | 12/2000 | Miya | 455/522 |
| 6,731,948 B1 * | 5/2004 | Lee et al. | 455/522 |
| 2001/0022779 A1 * | 9/2001 | Wheatley et al. | 370/252 |
| 2003/0157955 A1 * | 8/2003 | Jarvisalo et al. | 455/522 |

* cited by examiner

*Primary Examiner*—Nay Maung
*Assistant Examiner*—Angelica Perez
(74) *Attorney, Agent, or Firm*—Harrington & Smith, LLP

(57) ABSTRACT

A method and system for cooperative transmission power control in a communication system is provided. The method, operating within a system having a base station and at least on mobile station, includes the step of providing a power control data structure having memory fields indexed according to a predetermined parameter set. The next step retrieves from one of the memory fields a transmission power control value and adjusts a transmission power level of the mobile station according to the retrieved value.

17 Claims, 6 Drawing Sheets

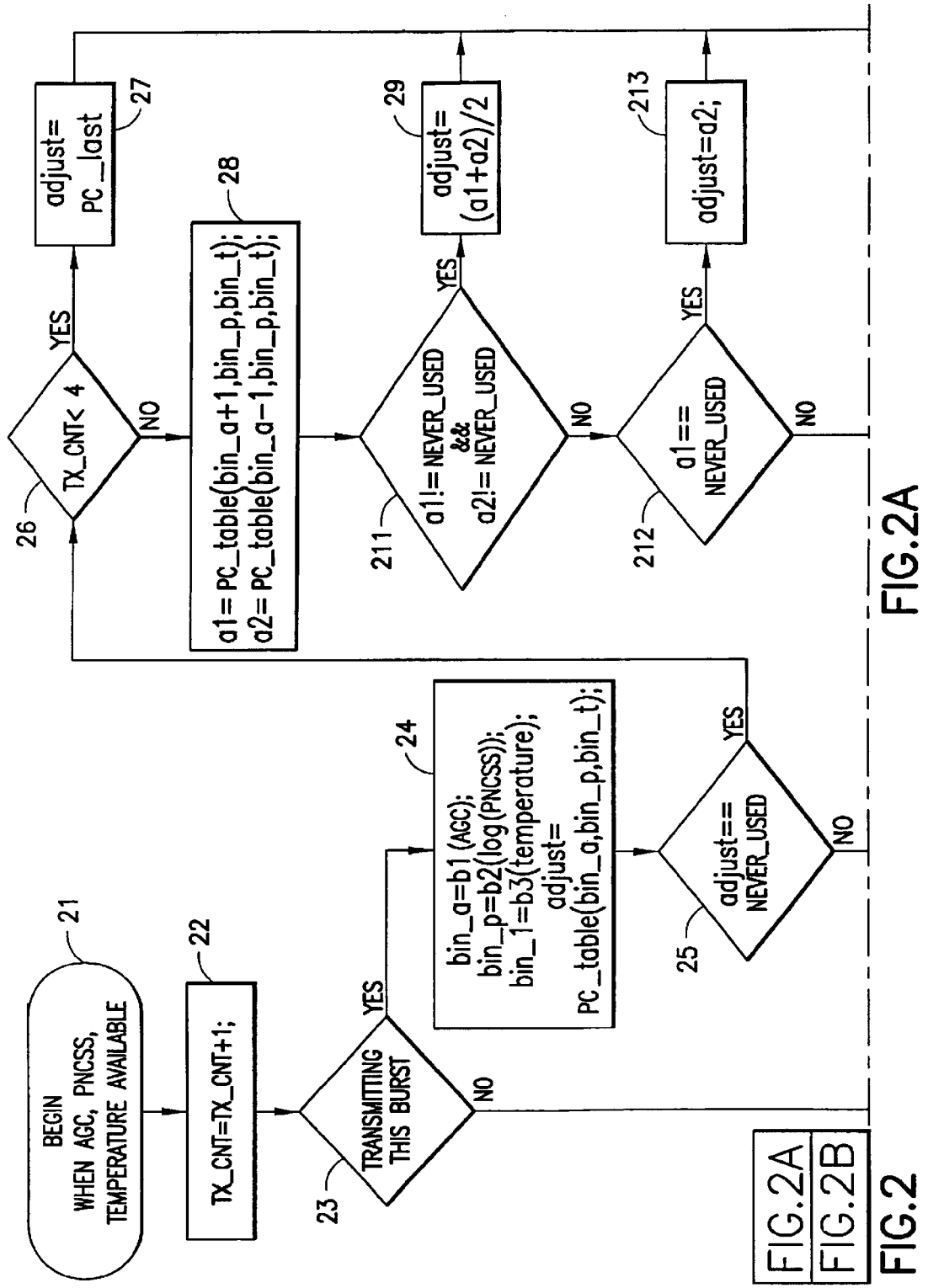

COOPERATIVE TRANSMISSION POWER CONTROL METHOD AND SYSTEM FOR CDMA COMMUNICATION SYSTEMS

BACKGROUND OF THE INVENTION

1. Field of the Invention

The present invention relates to spread spectrum communication systems using PN coding techniques and, more particularly, to provide dynamic calibration for power balancing imperative to high performance CDMA systems.

2. Prior Art

Spread spectrum (SS) systems, which may be CDMA systems, are well known in the art. SS systems can employ a transmission technique in which a pseudo-noise (PN) PN-code is used as a modulating waveform to spread the signal energy over a bandwidth much greater than the signal information bandwidth. At the receiver the signal is de-spread using a synchronized replica of the PN-code.

There are, in general, two basic types of SS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the center bandpass carrier frequency and $R_c$ represents the PN-code maximum chip rate, which in turn is an integer multiple of the symbol rate $R_s$. Multiple access systems employ DSSS techniques when transmitting multiple channels over the same frequency bandwidth to multiple receivers, each receiver having its own designated PN-code. Although each receiver receives the entire frequency bandwidth only the signal with the receiver's matching PN-code will appear intelligible, the rest appears as noise that is easily filtered. These systems are well known in the art and will not be discussed further.

As noted, the DHSS system PN-code sequence spreads the data signal over the available bandwidth such that the carrier appears to be noise-like and random to a receiver not using the same PN-code.

In communication systems having a central base station or hub and multiple subscriber units or consumer premise equipment (CPE), e.g., mobile units, the base station receives and decodes signals transmitted by each of the mobile units. It will be appreciated that in a CDMA type system, the signals transmitted by the mobile units preferably arrive at the base station with similar power levels; otherwise, interference may result and/or the gain control circuitry of the base station may suppress signals with comparatively lower power levels.

In order to regulate the received signal power levels many communication systems employ an open loop power control scheme. In this scheme the forward (base station to subscriber) channel loss is estimated by the subscriber unit measuring the total received power and combining this measurement with certain nominal base station parameters to calculate the estimated channel loss. The subscriber unit then adjusts its transmission power to compensate for the estimated channel loss. In this manner, and with all the subscriber units within the system using the same process, the power level from each subscriber unit received at the base station can be made to be substantially alike. However, open loop power control schemes generally require that the CPE needs to be calibrated for the open loop power control algorithm to generate accurate power control. However, it is often undesirable to pre-calibrate the subscriber unit because of expense.

Other communication systems may use a closed loop power control algorithm whereby the base station directly measures the received power from the subscriber unit and issues power level control signals, generally in the form of power step commands, to the subscriber unit to bring the received power level in line with operating conditions. However, under many conditions the closed loop approach may not respond quickly enough to compensate for operational conditions such as fading, thereby resulting in corrupted data communications.

Therefore, it is desirable to provide a method and system whereby the power level of signals transmitted by subscriber units may be controlled in an efficient and effective manner to compensate for power loss due to transmission channel conditions.

SUMMARY OF THE INVENTION

The foregoing and other problems are overcome, and other advantages are realized, in accordance with the presently preferred embodiments of these teachings.

In accordance with one embodiment of the present invention a system for controlling power levels in subscriber or mobile units is provided. The system includes a communications system with an AP (access point, hub, or base station) and multiple CPE units communication on forward and reverse channels. The forward channel (AP to CPE) and reverse channel (CPE to AP) are time division multiplexed on the same frequency band.

In accordance with another embodiment a method for controlling the transmitted power of a mobile unit such that it arrives at base station at a determined level is provided. The mobile unit adjusts transmission power to a value written in a look-up table, which is indexed by automatic gain control (AGC), temperature, and PN correlation accumulators (PNCA) parameters obtained during the mobile unit's receive burst. The look-up table is dynamically updated by the mobile unit and the AP. The AP calculates a power deviation by subtracting the measured PNCA from a target value, and then calculates a power control command based on the deviation and sends the power control command over the forward channel to the mobile unit. The mobile unit receives the power control command and adjusts the appropriate table entry (indexed by AGC, temperature, and PNCA) accordingly.

In accordance with another embodiment the invention a method for cooperative transmission power control in a communication system is provided. The method for a system having a base station and a mobile station includes the steps of providing a power control data structure having memory fields indexed according to a predetermined parameter retrieving from one of the memory fields a transmission power control value. The next step uses the retrieved transmission power control value to adjust a transmission power level of the mobile station.

In accordance with another embodiment the invention is also directed towards system for controlling transmission power level of a plurality of mobile stations in a code division multiple access (CDMA) communication system. Each mobile station in the system having a mobile station memory device for storing a plurality of mobile station transmission power values for the respective mobile station; a mobile station memory access controller for accessing the mobile station memory device; and a mobile station memory controller for updating the mobile station memory device. In addition the system has a base station memory controller for updating the plurality of mobile station transmission power values.

In accordance with another embodiment the invention is also directed towards a method for controlling mobile station transmission power in a communications system. The method for the communication system having a base station and a plurality of mobile stations, includes the steps of providing each mobile station a transmission power level look-up table and providing each mobile station an open-loop power control model. The next step accesses the transmission power level look-up table with the open-loop power control model.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
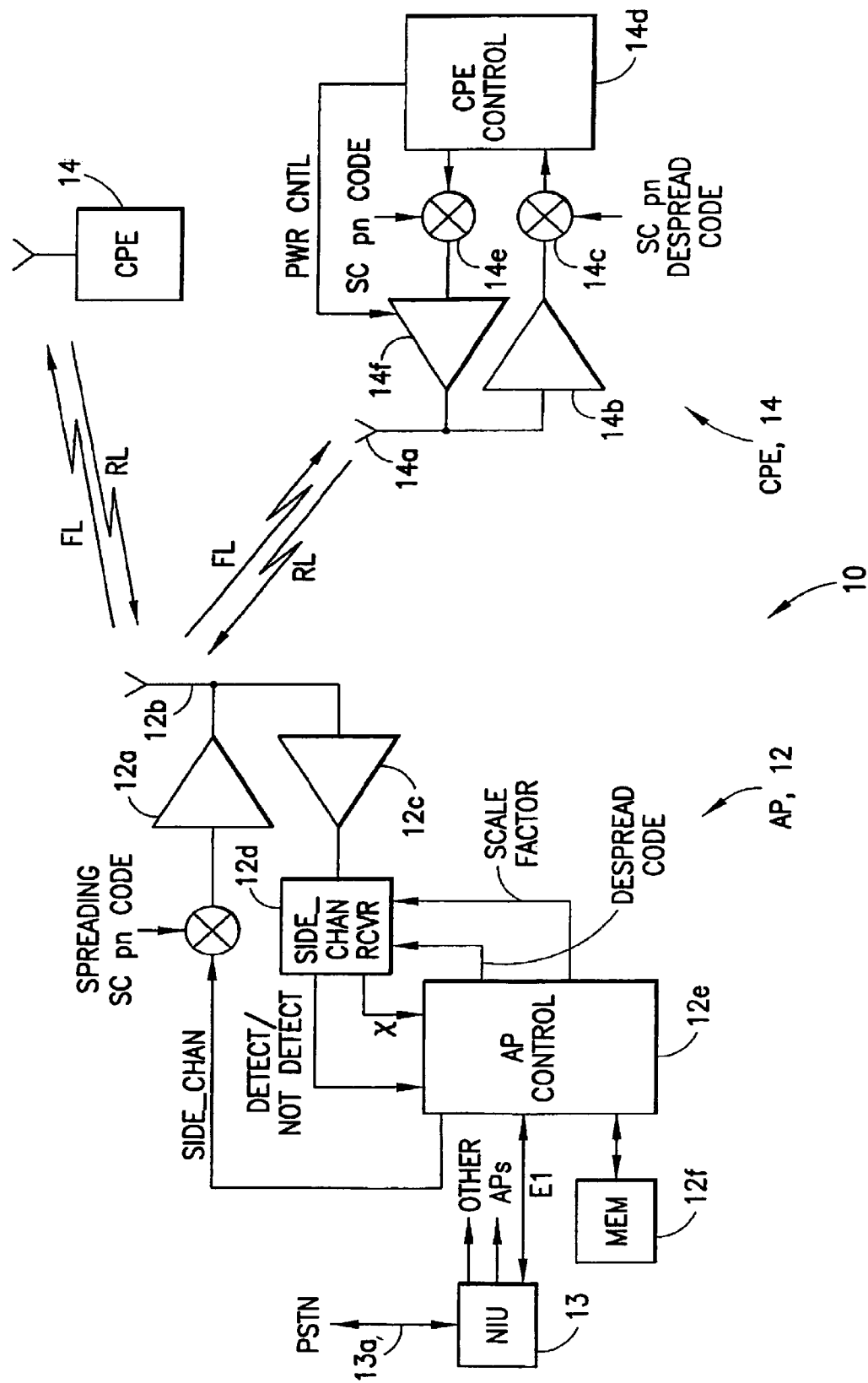
FIG. 1 is a block diagram of a communications system implementing power control features of the present invention.

Referring to FIG. 1, there is shown a pictorial diagram of a multi-user telecommunications system incorporating features of the present invention. Although the present invention will be described with reference to the embodiment shown in the drawings, it should be understood that the present invention might be embodied in many alternate forms of embodiments.

Still referring to FIG. 1 there is shown a Fixed Wireless System (FWS) 10 that is suitable for practicing this invention. Specifically, the FWS 10 employs direct sequence spread spectrum based CDMA techniques over an air link to provide local access to subscribers, and offers very high quality, highly reliable service. The FWS 10 is a synchronous CDMA (S-CDMA) communications system wherein forward link (FL) transmissions from a base station, referred to also as access point (AP) 12, for a plurality of transceiver units, referred to herein as user or consumer premise equipment (CPE) 14, which may be symbol and chip aligned in time, and wherein the CPE 14 operates to receive the FL transmissions and to synchronize to one of the transmissions. Each CPE 14 also transmits a signal on a reverse link (RL) to AP 12 in order to synchronize the timing of its transmissions to the AP 12, and to generally perform bi-directional communications. The FWS 10 is suitable for use in implementing a telecommunications system that conveys multirate voice and/or data between the AP 12 and the CPEs 14.

The AP 12, also referred to as Radio Base Unit (RBU), includes circuitry for generating a plurality of user signals (USER$_1$ to USER$_n$), which are not shown in FIG. 1, and a synchronous side channel (SIDE$_{chan}$) signal that is continuously transmitted. Each of these signals is assigned a respective PN spreading code and is modulated therewith before being applied to a transmitter 12a having an antenna 12b. When transmitted on the FL the transmissions are modulated in phase quadrature, and the CPEs 14 are assumed to include suitable phase demodulators for deriving in-phase (I) and quadrature (Q) components there from. The AP 12 is capable of transmitting a plurality of frequency channels. By example, each frequency channel includes up to 128 code channels, and has a center frequency in the range of 2 GHz to 3 GHz.

The AP 12 also includes a receiver 12c having an output coupled to a side channel receiver 12d. The side channel receiver 12d receives as inputs the spread signal from the receiver 12c, a scale factor signal, and a side channel despread PN code. These latter two signals are sourced from a AP processor or controller 12e. The scale factor signal can be fixed, or can be made adaptive as a function of the number of CPEs 14 that are transmitting on the reverse channel. The side channel receiver 12d outputs a detect/not detect signal to the AP controller 12e for indicating a detection of a transmission from one of the CPEs 14, and also outputs a power estimate value. A read/write memory (MEM) 12f is bi-directionally coupled to the AP controller 12e for storing and selecting system parameters such as and power control values in accordance with the teachings of the present invention.

Figure 5:
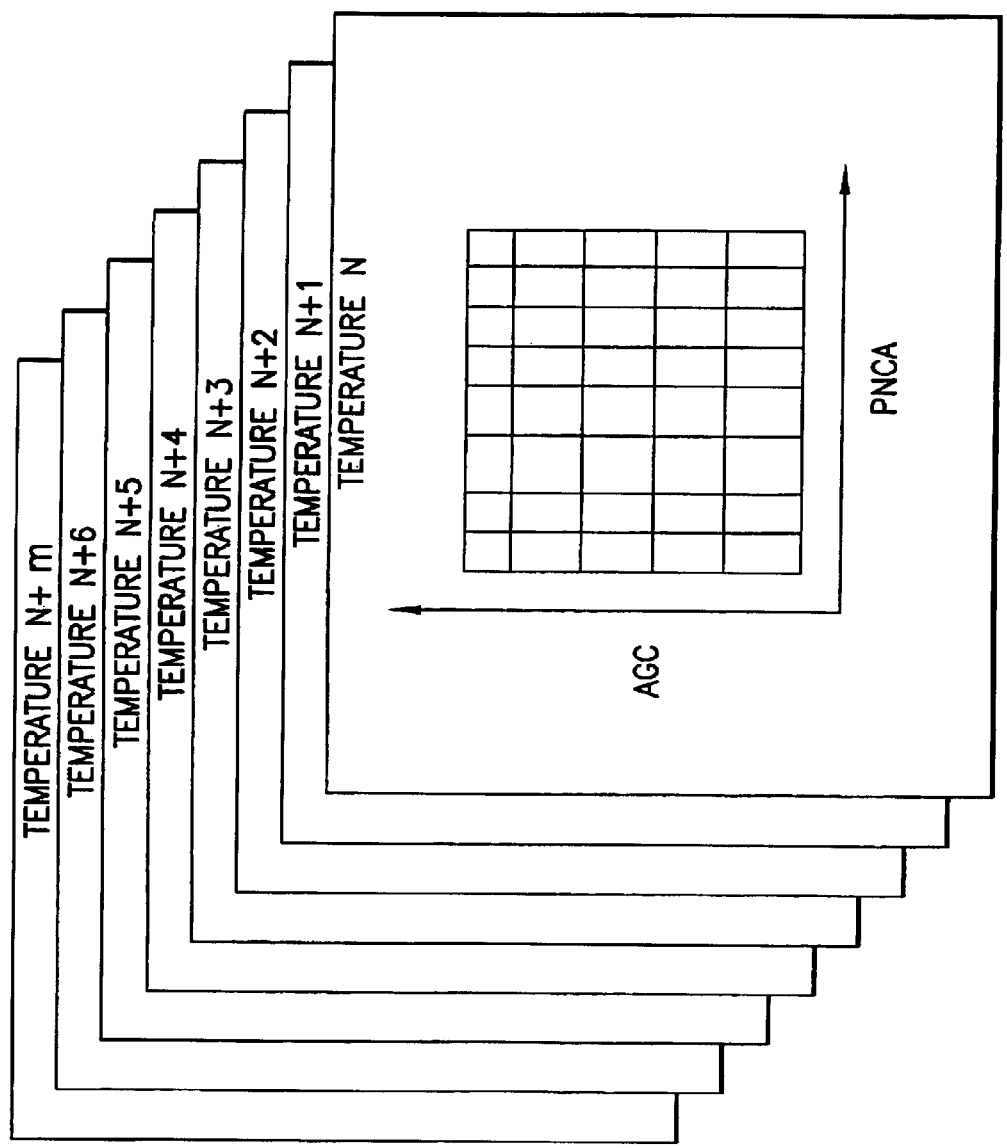
FIG. 5 is a pictorial diagram illustrating the data structure one embodiment of the present invention power control tables.

In accordance with the teachings of the invention presented herein the cooperative power control in a CDMA communication system preferably consist of three cooperating finite sequence of method steps and dynamically generated look-up tables. The finite sequences of steps hereinafter referred to as the open loop power control (OLPC) algorithm that resides in the AP; and the bifurcated power control table update (PCTU) algorithm, which is distributed over both the AP and CPE. The OLPC algorithm determines the AGC, PC correlation accumulator, and the temperature; it uses these values as an index into the look-tables to find the CPE transmit power for the reverse link. It will be appreciated that although the algorithm is referred to as open loop it is a modified open loop in that it access the look-up tables, which are populated based upon PCTU algorithm routines. The look-up tables contain the information of the AGC and variable gain amplifier (VGA) gain curves which correspond to particular ambient temperatures (see FIG. 5). In a preferred embodiment the temperature index may be selected by the temperature index within a predetermined range of the measured ambient temperature. In alternate embodiments any suitable method for selecting the temperature index and a corresponding transmit power may be used. For example, in one embodiment, if a measured ambient temperature is between two temperature indexes then the appropriate transmit power may be determined by interpolating between the power transmit values associated with each of the two temperature indexes.

The AP PCTU algorithm updates the PC look-up tables by measuring a deviation at the AP and sends a look-up table adjustment to the CPE on the forward link for that particular table index or bin. The PC look-up tables are preferably a multidimensional array, but in alternate embodiments any suitable data structure could be used. For example, a data structure that takes advantage of the sparse, banded structure to reduce memory requirements could be used. In addition, in alternate embodiments, more than one type of memory structure could be used in different CPEs. Further, it will be appreciated that the table updates or adjustments from the AP dynamically calibrates the CPE; so that knowledge of the CPE's AGC and VGA gain curves are not required. The teachings of the invention will be described and made clear with the following descriptions of each of the algorithms.

Open Loop Power Control

Figure 2B:
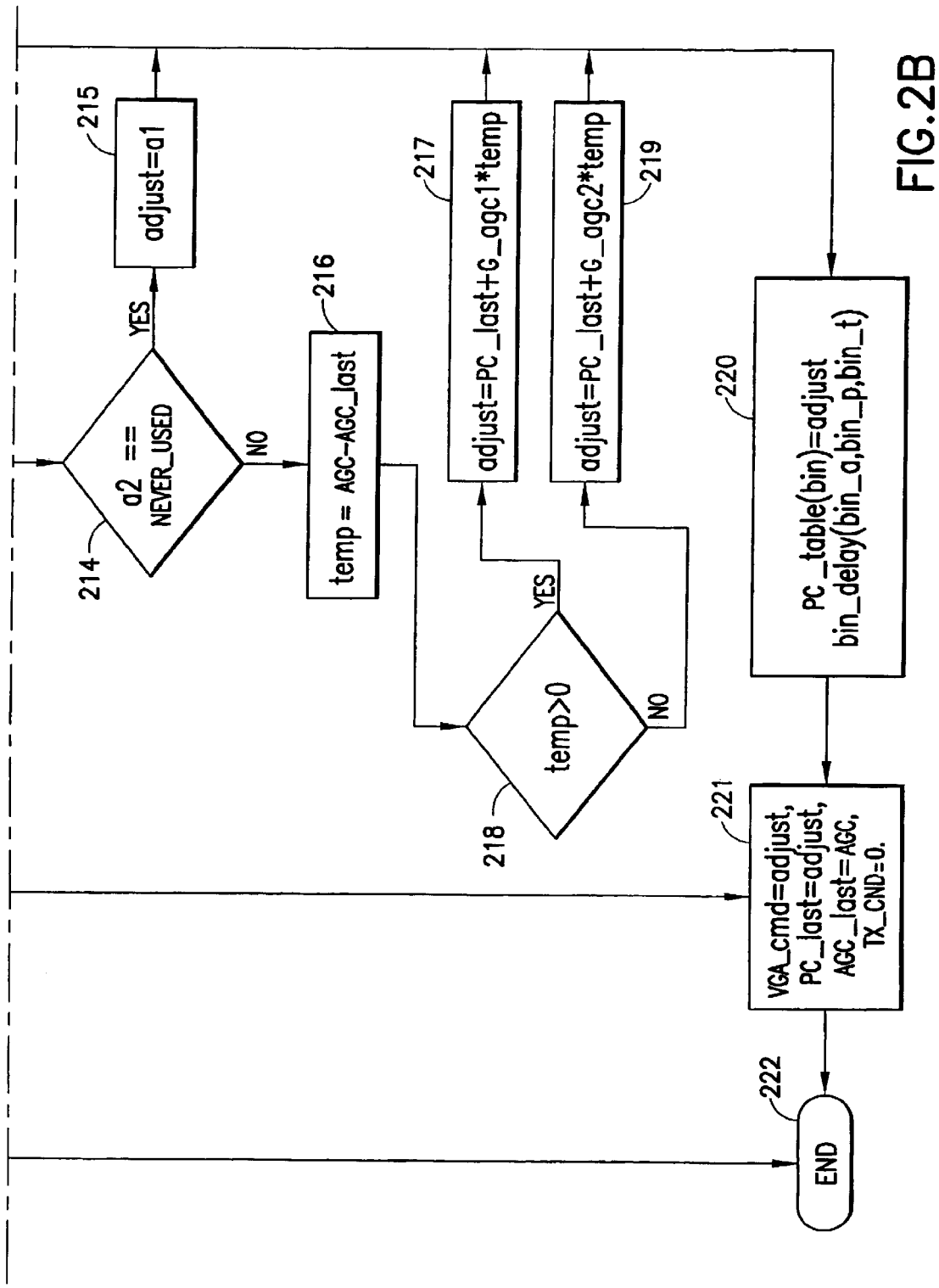
FIG. 2, shown as FIGS. 2A–2B on separate sheets, is a method flow chart of one implementation of the CPE open loop power control algorithm in accordance with the teachings of the present invention.

Referring now to FIG. 2 there is shown method steps for one embodiment of the OLPC algorithm. The OLPC is preferably executed after the AGC, PNCSS, and temperature are available, step 21, and after the PCTU algorithms have executed, but before the transmitting burst, Step 22 is a transmit burst counter for counting the number of AP transmission bursts; which number is used later in the process as a threshold determinate. If the CPE is scheduled, step 23, to transmit during the next burst then the OLPC algorithm, step 24 finds which bin (index) in the power control (PC) look-up table (PC_table) to use based on functions b1, b2, and b3 of the AGC, PNCSS, and temperature, respectively, where each entry corresponds to a bin of a range of AGC, PNCSS, and temperature values. In step 24 b2 is a log function but in alternate embodiments b2 may be any suitable function; likewise with functions b1 and b3. If the NEVER_USED value from step 25 is not returned then the bin exist and step 221 changes the VGA register to the value in this bin. Alternatively, if the bin doesn't exist, step 25, then an estimate of the value is preferably calculated as described herein. If the AP transmitted within a predetermined number of bursts, step 26, for example, the last four bursts, then the CPE uses, step 27, the last PC value used. Otherwise, step 28 points to bins on either side of desired bin. If values exists in these adjacent bins, as determined by step 211, then step 29 implements a function, such as averaging the adjacent bins for example, get the value for the present bin. In alternate embodiments the bins used for determining the present bin may be any suitable number of bins away from the present bin. Likewise, in alternate embodiments the function may be any suitable function. For example, two or more bins within a particular row, column, or combination thereof, may be used to determine any suitable function such as a straight line equation or a power function such as $y=ax^b$; the function then used by step 29 to determine a value for the present bin. In the present embodiment using an averaging function, steps 212–215, select an available adjacent bin if one of the bins are empty or not available for averaging. If neither of the bins are available or are both empty then steps 216–19 estimate the value by using an average slope (G_agc1 and G_agc2) of the AGC and the change in AGC. The two AGC slopes are used to allow an underestimate depending if the signal is going into or coming out of a fade region. While the CPE is continuously transmitting during a fade and is passing through table bins that haven't been hit before, the PC algorithms preferably have the same performance as the original CLPC.

Power Control Table Update

The bifurcated power control table update (PCTU) algorithm is distributed between the CPE and the AP.

Figure 3:
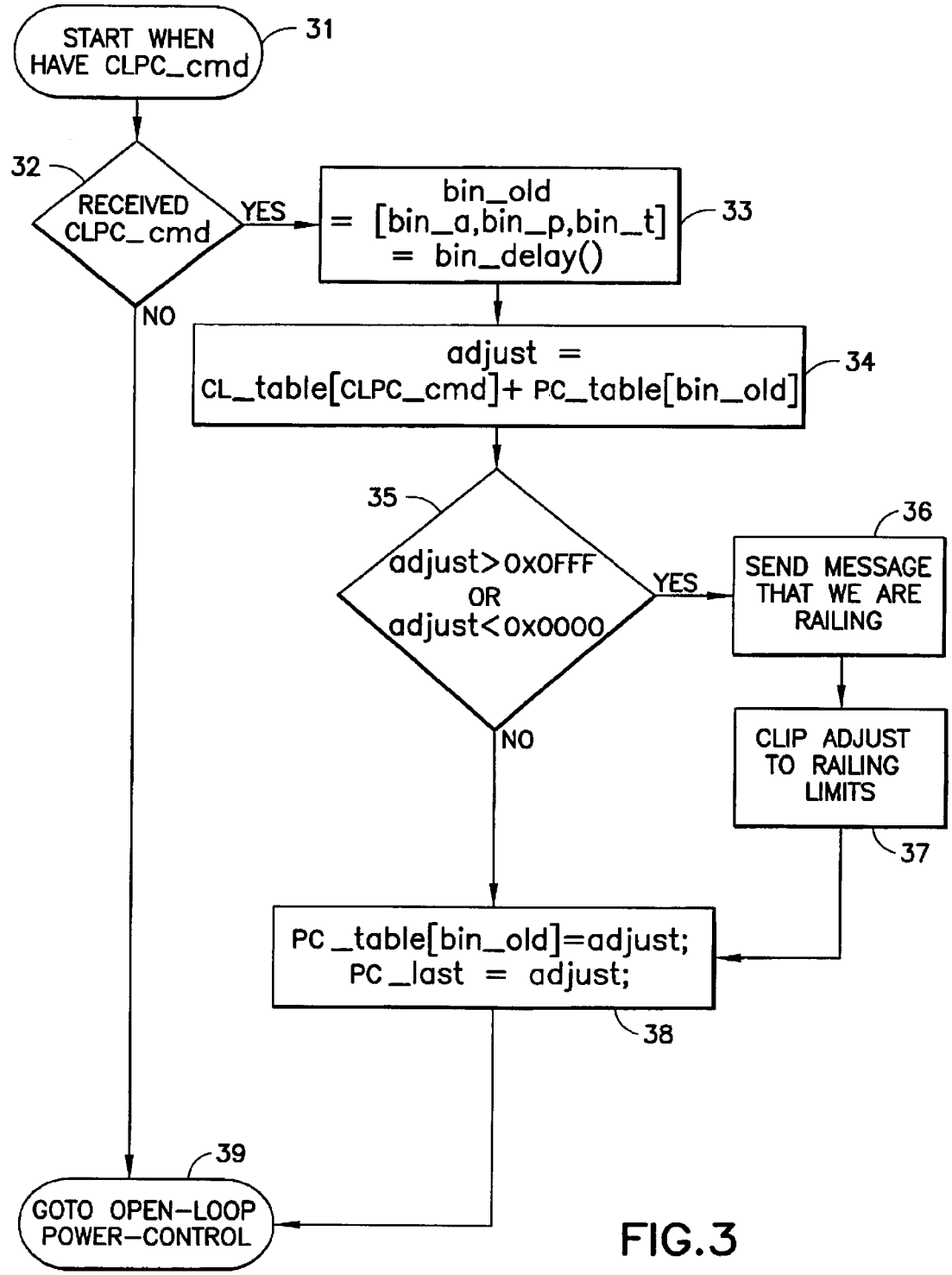
FIG. 3 is a method flow chart of one implementation of the AP power control algorithm in accordance with the teachings of the present invention.

Referring now to FIG. 3, a flow chart illustrating the steps for one embodiment of the steps for updating the power control table is shown. Preferably the PCTU is executed before the above-described OLPC in order to minimize delay in response to a PCcmd. It can begin execution when the CLPC commands (PCcmd) have been obtained, step 31, from the forward link; a PCcmd is issued from the AP after every burst that the AP receives from the CPE. If a CLPC has not been received, as determined by step 32, the above-described OLPC table update algorithm is used. The CLPC adds a change, steps 33 and 34, to the table bin used during the last CPE transition. If the adjustment causes the value to be outside a valid range for the VGA as determined by step 35, then the value is clipped to the railing limits and a message is sent, steps 37 and 36, respectively, to the AP indicating that the CPE cannot make the requested change. As the bin is indexed repeatedly, step 38, even if not sequentially, the CLPC will adjust the value until it converges to the correct value. If the same table bin is being repeatedly indexed during continuous transmission, then the convergence properties are preferably equivalent to an original CLPC.

Figure 4:
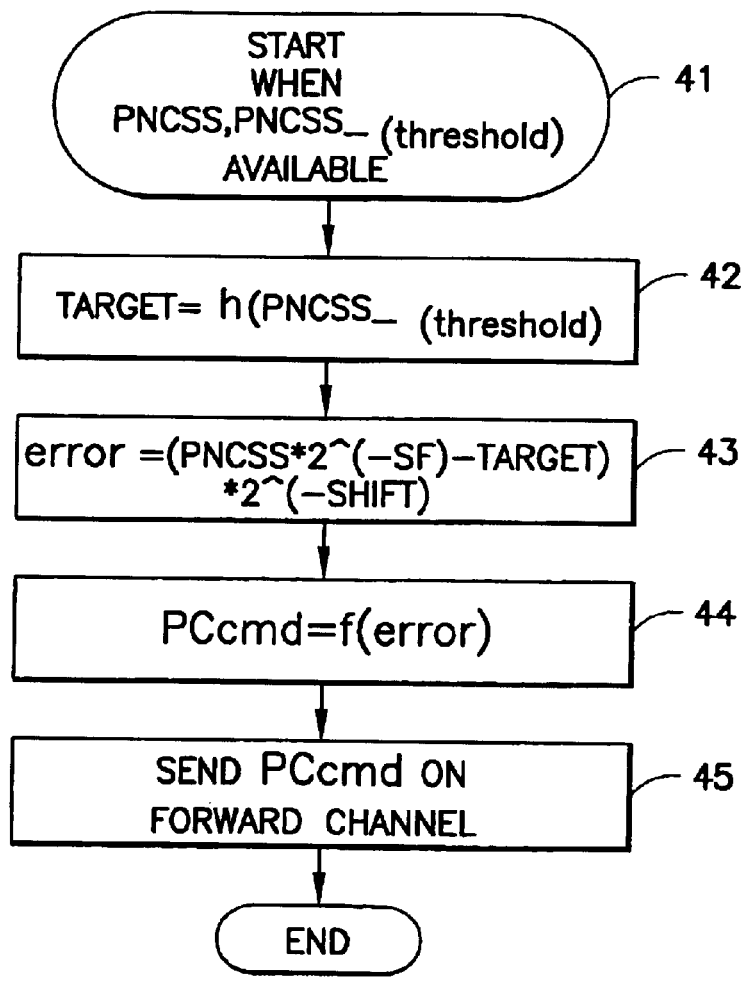
FIG. 4 is a method flow chart of one implementation of a power control table update in accordance with the teachings of the present invention.

The PCTU algorithm of the AP is shown in FIG. 4. Preferably, it may start after the normalized PN correlation squared sum (PNCSS) has been obtained, step 41. The PNCSS of any suitable unused channel code is used to estimate the noise level; which is used to select the value of the TARGET. The received power deviation estimate is calculated, step 43, based on the difference in the received PNCSS and the target value. This difference value is translated into a PC command (PCcmd), step 44, and sent on the forward channel, or transmitter, step 45, for transmission over the forward channel to the CPE.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for cooperative transmission power control in a communication system having a first and a second transceiver device, the method comprising the steps of:

providing a power control data structure, the power control data structure comprising memory fields indexed according to a predetermined parameter set;

wherein the step of retrieving from one of the memory fields the transmission power control value further comprises the step of accessing the power control data structure according to an automatic gain control (AGC), a PN code correlation accumulator (PNCA) parameter, and an ambient receiver temperature parameter;

retrieving from one of the memory fields a transmission power control value; and using the retrieved transmission power control value to adjust a transmission power level of the second transceiver device.

2. A method as in claim 1 wherein the step of providing the power control data structure further comprises the step of providing at least one power control table.

3. A method as in claim 1 wherein the step of retrieving from one of the memory fields the transmission power control value further comprises the steps of:

determining if the accessed memory field is null, and in response to a null determination executing the following steps:

determining a number of transmission bursts since transmitted, and in response to the determined number of transmission bursts;

if the number of bursts since transmitted is below a predetermined value then using a previous transmission power control value, wherein the previous transmission power control value comprises the last transmission power control value;

if the number of bursts since transmitted is above the predetermined value then selecting at least one transmission power control value from an alternate memory field and deriving a current transmission power control value;

deriving the current transmission power control value based upon the previous transmission power control value and whether or not the receiver device is entering or leaving a signal fade region if the at least one transmission power control value is also null; and populating the accessed memory field with the current transmission power control value.

4. A method as in claim 1 wherein the step of providing the power control data structure further comprises the steps of:

receiving a power command table update from the first transceiver device, wherein the power command table update is directed to at least one memory field within the power control data structure;

adjusting the at least one memory field in accordance with the received power command table update from the first transceiver device; and limiting the adjusted memory field to a predetermined threshold in response to determining the adjusted memory field exceeds the predetermined threshold.

5. A method as in claim 4 wherein the step of limiting the adjusted memory field to the predetermined threshold further comprises the step of sending a message to the first transceiver device.

6. A method as in claim 4 wherein the step of receiving the power command table update from the first transceiver device further comprises the steps of:

determining a noise level at the first transceiver device;

determining a difference between the noise level and a predetermined noise target;

converting the difference to a power command table update; and transmitting the power command table update to the receiver device.

7. A method as in claim 6 wherein the step of determining the noise level at the first transceiver device further comprises the step of finding a pseudo-noise correlation squared sum (PNSS) of a received PN code.

8. A method as in claim 1 wherein the communications systems further comprises a code division multiple access (CDMA) communication system.

9. A system for controlling transmission power level of a plurality of receiver devices in a code division multiple access (CDMA) communication system having at least one access point device, the system comprising:

a plurality of at least two receivers;

each receiver device comprising:

a receiver device memory device for storing, according to a predetermined parameter set that comprises an automatic gain control value (AGC), an ambient temperature value, and a PN correlation accumulator (PNCA) value, a plurality of receiver device transmission power values for the respective receiver device;

a receiver device memory access controller for accessing the receiver device memory device;

a receiver device memory controller for updating the receiver device memory device; and access point device memory controller for updating the plurality of receiver device transmission power values.

10. A system as in claim 9 wherein each receiver device further comprises a temperature controller for determining ambient temperature.

11. A system as in claim 9 wherein the receiver device memory access controller comprises at least one open loop memory access controller.

12. A method for controlling receiver device transmission power in a communications system, the communication system having an access point device and a plurality of receiver devices, the method comprising the steps of:

providing each receiver device a transmission power level look-up table that relates transmission power to a set of parameters that include an automatic gain control value (AGC), an ambient temperature value, and a PN correlation accumulator (PNCA) value;

providing each receiver device an open-loop power control model; and accessing the transmission power level look-up table with the open-loop power control model setting the transmit power according to said model.

13. A method as in claim 12 wherein the step of providing each receiver device the transmission power level look-up table further comprises the steps of:

at the access point device:

determining a received power level from one of the plurality of receiver devices;

determining a transmission power deviation for that receiver device;

transmitting a first update value based derived from the transmission power deviation to the receiver device; and at the receiver device, using the first update value to update the transmission power level look-up table.

14. A method as in claim 13 wherein the step of determining at the base station the received power level further comprises the steps of:

accumulating a predetermined number of pseudo noise (PN) code correlations; and squaring the sum of the predetermined number of PN code correlations (PNCSS).

15. A method as in claim 14 wherein the step of determining the transmission power deviation further comprises the step of comparing PNCSS to a predetermined target value.

16. A method as in claim 15 wherein the step of determining the transmission power deviation further comprises the step of determining the transmission power deviation according to:

$$\text{deviation}=(PNCSS*2\hat{0}(SF)-\text{Target})*2\hat{0}(-\text{Shift}).$$

17. A method as in claim 16 wherein the step of using the first update value to update the transmission power level look-up table further comprises the steps of:

determining if the first update value exceeds a predetermined range; and adjusting the first update value to closest range limit if determining the first update value exceeds the predetermined range.

* * * * *

UNITED STATES PATENT AND TRADEMARK OFFICE
CERTIFICATE OF CORRECTION

PATENT NO. : 6,954,622 B2
DATED : October 11, 2005
INVENTOR(S) : Nelson et al.

It is certified that error appears in the above-identified patent and that said Letters Patent is hereby corrected as shown below:

Column 8,
Line 55, both "Ô" symbols in the equation should be deleted and -- ˆ -- should be inserted in both places.

Signed and Sealed this

Twenty-seventh Day of December, 2005

JON W. DUDAS
*Director of the United States Patent and Trademark Office*